Figure 5:
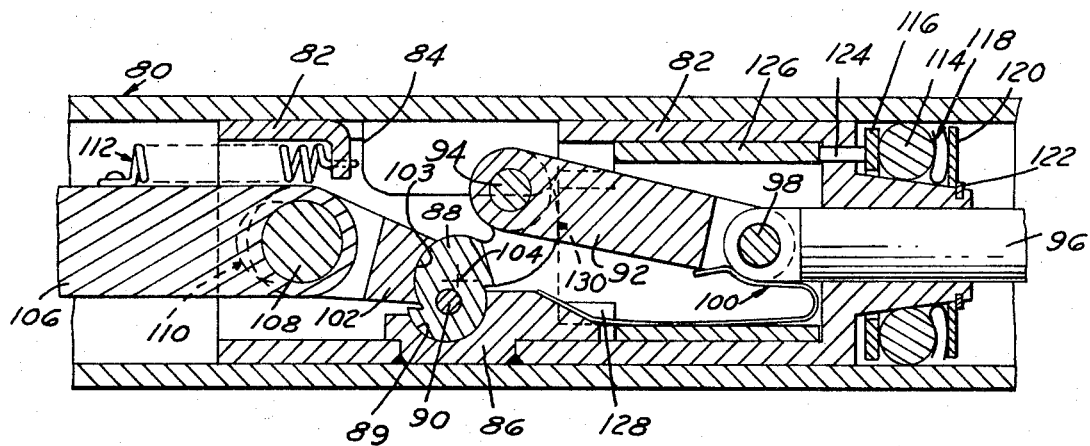

United States Patent [19]

Brems

[11] 3,745,842
[45] July 17, 1973

[54] FORCE TRANSFERRING AND MULTIPLYING SYSTEM

[76] Inventor: John Henry Brems, 32867 White Oaks Trail, Birmingham, Mich. 48010

[22] Filed: Nov. 2, 1971

[21] Appl. No.: 194,928

[52] U.S. Cl. ............................................... 74/110
[51] Int. Cl. ............................................ F16h 21/44
[58] Field of Search .................................... 74/110

[56] References Cited
UNITED STATES PATENTS

| | | | |
|---|---|---|---|
| 1,886,241 | 11/1932 | Chapman | 74/110 |
| 455,248 | 6/1891 | Fennell | 74/110 |
| 2,047,061 | 7/1936 | Edwards | 74/110 |
| 1,698,918 | 1/1929 | Kubiac | 74/110 |
| 2,087,885 | 7/1937 | Fleischel | 74/110 |
| 2,165,985 | 7/1939 | Schwentler | 74/110 |
| 2,732,723 | 1/1956 | Crofton | 74/110 |

Primary Examiner—Charles J. Myhre
Assistant Examiner—Wesley S. Ratliff, Jr.
Attorney—Arthur Raisch, Robert A. Choate, et al.

[57] ABSTRACT

A lineal motion and force transmitting mechanism which will transmit motion directly until a predetermined resistance is met at which time a force multiplying action takes place to increase the output force over the input force, this being accomplished by a lever and linkage assembly with a moving lever fulcrum which is arrested in its motion upon meeting resistance. This allows the incorporated lever to function to produce the mechanical advantage of the particular lever system.

12 Claims, 11 Drawing Figures

PATENTED JUL 17 1973 3,745,842
SHEET 1 OF 3
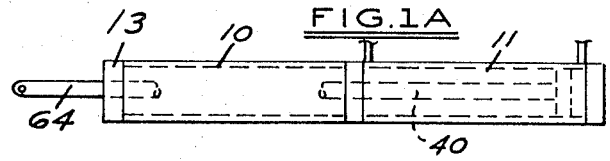
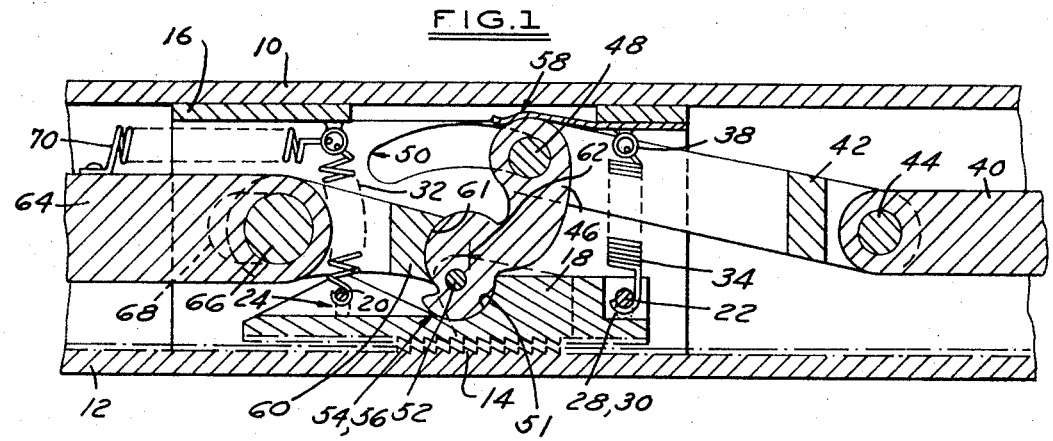
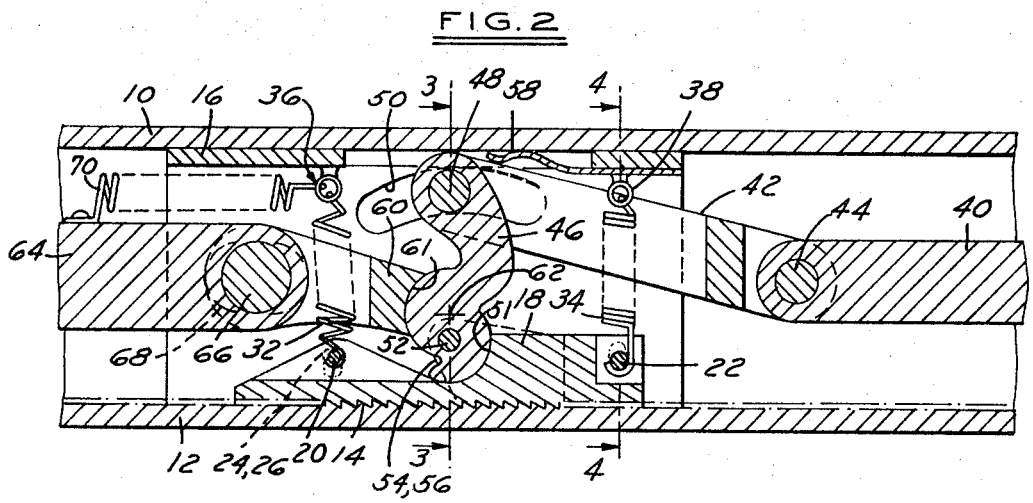
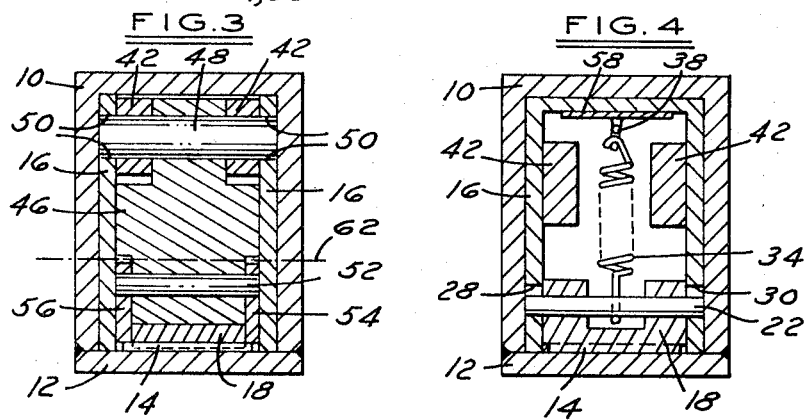

FORCE TRANSFERRING AND MULTIPLYING SYSTEM

This invention relates to a linear movement and force application system.

It is an object of this invention to provide a system in which the mechanical advantage from the input to the output is multiplied by a factor greater than one over some small range of the output movement.

It is a further object of this invention to provide a device in which the output movement is equal to the input movement, and, therefore, without force multiplication, until the output encounters an external load in excess of an adjustable threshold load, at which point of operation, the incremental input movement becomes greater than the incremental output movement, and the output force exerted becomes greater than the input force applied.

It is a further object of this invention to provide a device in which the shift point from one mode of operation to the other can occur at any point within the design stroke of the device such point being determined solely by external conditions.

It is a further object of this invention to provide a device in which the amount of force multiplication generated after the output load exceeds the threshold value may be controlled by the internal geometry of the force multiplication system.

It is a further object of this invention to provide a device in which the output member is coupled to the input member during the return stroke of the device.

In the field of multiple spot resistance welding such as employed in the assembly of automotive bodies, household appliances, and other assemblies made up of multiple metal components, many situations arise in which the location of individual resistance weld spots are sufficiently close together to preclude their being made in a single operation. This is due to the size of the cylinders used to activate the individual electrodes against the workpieces, i.e., the diameters of the cylinders are greater than the spot-to-spot center distances. Accordingly, multiple stage fixtures and operations are required to weld all the spots.

In most such applications, the load encountered by the electrode and the cylinder which actuates it is very small until the electrode contacts the workpiece, at which point a very high force is required to make a satisfactory resistance spot weld. However, the amount of movement required of the electrode during the welding process is quite small. It is still exceedingly important that during the weld interval the force exerted by the electrode against the workpiece be maintained and that there be no lag in the small follow-up movement of the electrode.

It is another characteristic of these applications that the amount that the cylinder or other actuating mechanism is extended at that point where the electrode contacts the workpiece will vary from actuator to actuator, and over a period of time, may vary considerably even for a given actuator, due to the wearing away and redressing of the electrode.

It is another characteristic of note in these applications that the actuator stroke during extension and retraction, in addition to requiring relatively little force, must in many cases be of considerably linear magnitude to reach into depressed locations and subsequently retract to provide clearance for automatic part transferring operations. Since little force is required for this approach and retract movement, it is wasteful and inefficient to employ a force and movement system which can exert the maximum force over the entire stroke.

An ideal resistance weld electrode actuator to be used in multiple spot resistance weld fixtures therefore has the following characteristics:

1. Small diameter to permit close spacing in multiple spot fixtures.
2. Adequate stroke during which a relatively small force is required for both extension and retraction.
3. Very high force capacity over a relatively short stroke during extension when the electrode touches the work.
4. A variable position of extension when the high force is required with such position being self determined by the actuation mechanism.

The device described herein meets all the requirements of the application outlined above. There are many other applications of linear actuators in which these same characteristics are desirable, among which, by way of example, are stamping, piercing, embossing, and some types of forming.

Other objects and features of the invention relating to details of construction and operation will be apparent in the following description and claims in which are set forth the principles of operation together with the best mode presently contemplated for the invention.

Drawings accompany the disclosure and the various views thereof may be briefly described as follows:

FIG. 1, a longitudinal centerline section of the mechanism operating in the direct coupled mode.

FIG. 1A, an elevation of an assembly embodying the invention.

FIG. 2, a longitudinal centerline section of the mechanism operating in the force multiplication mode.

FIG. 3, a transverse section through the mechanism on a line 3—3 of FIG. 2.

FIG. 4, a transverse section through the mechanism on a line 4—4 of FIG. 2.

FIG. 5, a longitudinal centerline section of an alternate design mechanism operating in the direct coupled mode.

Figure 6:
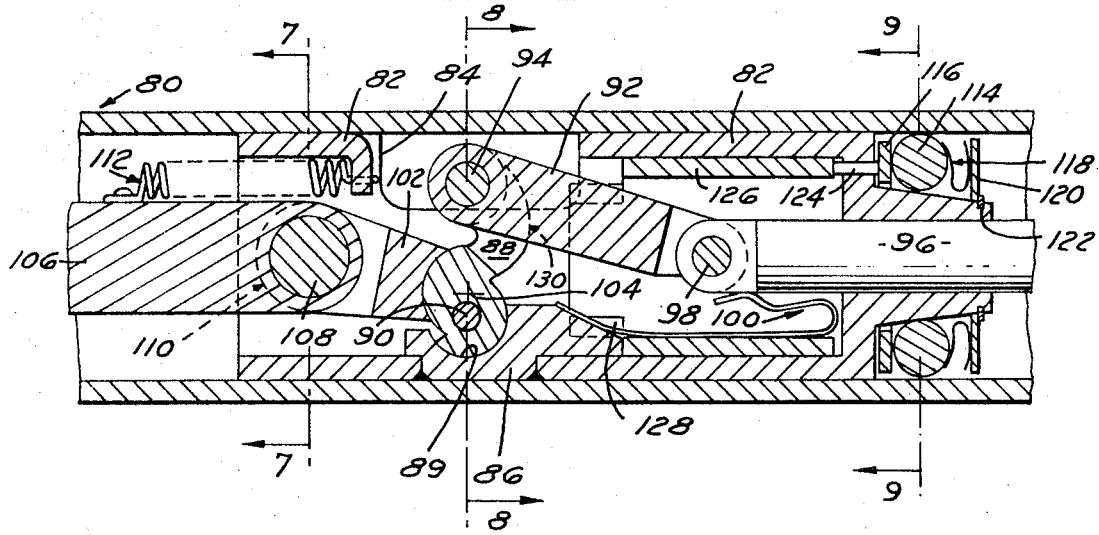

FIG. 6, a longitudinal centerline section of the alternate design mechanism operating in the force multiplication mode.

Figure 7:
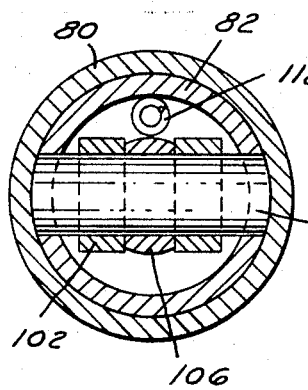

FIG. 7, a transverse section through the alternate design mechanism on line 7—7 of FIG. 6.

Figure 8:
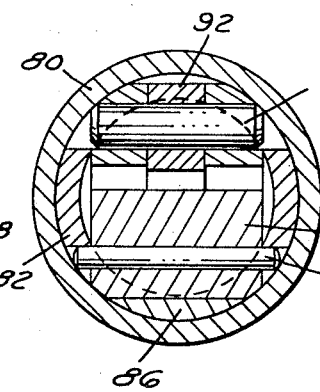

FIG. 8, a transverse section through the alternate design mechanism on line 8—8 of FIG. 6.

Figure 9:

FIG. 9, a transverse section through the alternate design mechanism on line 9—9 of FIG. 6.

Figure 10:
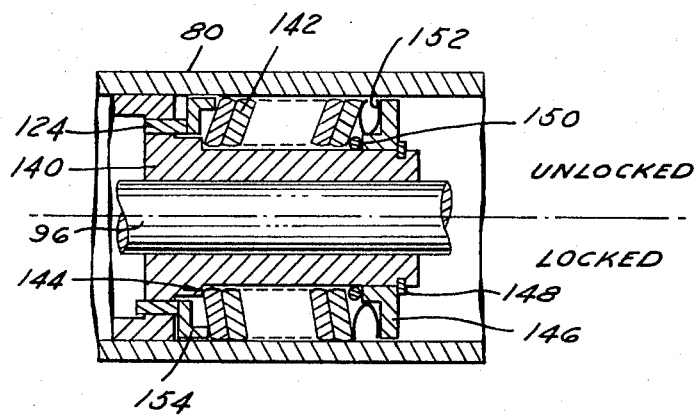

FIG. 10, a partial longitudinal centerline section of a second alternate design mechanism.

Referring to the drawing FIGS. 1, 1A, 2, 3 and 4, the mechanism is housed in a U frame 10, to which is welded or otherwise suitably fastened a bottom plate frame 12, as viewed in FIG. 1, thereby forming a rectangular housing. This is attached at one end to a suitable prime mover 11 such as an air cylinder. The other end has attached to it a suitable output head 13 which guides and seals the slidably mounted output rod using conventional techniques. The bottom plate 12 has cut into its upper surface a series of sawtooth type teeth 14 which extend along the entire length of the plate frame 12, but which extend only partially along its width. These teeth 14 are nominally perpendicular to the axis of the frame, but may be slightly inclined to permit manufacturing by hobbing or other continuous cutting techniques.

A subframe 16 is slidably mounted within the rectangular frame 10, 12; the subframe 16 is a U section member, guided on its three sides by the U frame 10, and guided on its open side by two flat surfaces on the bottom plate frame 12 on either side of the teeth. A fulcrum member 18 is attached to the subframe 16 through two pins 20 and 22 which extend through crossholes in the fulcrum member 18; these pins extend beyond the sides of the fulcrum member 18 and pin 20 engages the short slots 24 and 26 on opposite sides of the subframe 16 are similarly pin 22 engages short slots 28 and 30. This arrangement permits the fulcrum member 18 to move slightly relative to the subframe 16 in a direction perpendicular to the axis of movement and to the bottom plate 12. The underside of the fulcrum member 18 has cut into it a series of sawtooth type teeth which are an exact mating replica of those cut into the bottom plate 12. Two springs 32 and 34 exert a force on the pins 20 and 22 to resiliently bias the fulcrum member 18 teeth out of engagement with the teeth of the plate frame 12. Spring 32 is attached to eye screw 36, and spring 34 is attached to eye screw 38, both of which are attached to the inside of subframe 16. This condition in which the teeth of the fulcrum member 18 are not in engagement with the teeth of the plate frame 12 is shown in FIG. 1 and is termed the direct coupled mode.

An input rod 40, which is the output rod of the driving air cylinder or equivalent prime mover, is connected to input link 42 through a connector pin 44. The other end of the input link 42 is connected to a lever 46 by pin 48. This pin 48 extends beyond the input link 42 on both sides and engages the two camslots 50 cut into subframe 16. The other end of the lever 46 is seated in a bearing saddle 51 in fulcrum member 18. A pin 52 extends through lever 46 about an axis which coincides with the axis of the cylindrical bearing saddle 51 in fulcrum member 18. The cam slots 50 are primarily true arcs around the axis of pivot pin 52 but the right end of these slots, as viewed in FIGS. 1 and 2, has a slight rise which will lift the fulcrum member 18 out of engagement with bottom plate 12. This pin engages mating holes in retainer plates 54 and 56 which are attached to the sides of fulcrum member 18, FIG. 3. This arrangement permits the lever 46 to pivot about the axis of pin 52 relative to the fulcrum member 18, and the presence of the bearing saddle 51 greatly increases the bearing capacity of this pivot joint in the direction in which it is most greatly loaded. The input link 42 and the upper end of the lever 46 are held in the initial position shown in FIG. 1 by detent spring 58.

An output link 60 is mated to the lever 46 through a cylindrical surface 61, forming a unidirectional bearing about an axis 62. The other end of the output link 60 is connected to output rod 64 through pin 66. This pin 66 extends on both sides beyond link 60 to engage slots 68 in the subframe 16. A spring 70 is connected between output rod 64 and subframe 16 to keep the unidirectional bearing surfaces 61 mated between link 60 and lever 46. This arrangement forms a second order lever, i.e., a lever wherein the output point is between the force input point and the fulcrum.

During that portion of the extension stroke where the output load encountered is below the threshold value, the entire mechanism assembly mounted in the subframe 16 moves as a unit through the frame 10, 12. The input and output movements are identically equal and there is no force multiplication.

At any point in the stroke that the output rod 64 encounters a load in excess of an amount determined by both the detent spring 58 and the two tension springs 32 and 34, the lever 46 starts to rotate in a counterclockwise direction due to the couple being exerted through the input link 42 and the resistance provided by the output link 60. During the initial counterclockwise rotation of the lever 46, the detent spring 58 exerts a downward force on the lever 46, and through it, a downward force on the fulcrum member 18. The resistance provided by the output link 60 from the now stationary output rod 64 causes the output link to pivot about axis 62 which causes the lower end of the lever 46 and the fulcrum member 18 to move to the right as shown in FIGS. 1 and 2.

This combination of movements of the fulcrum member to the right and spring loaded downward causes the teeth in the bottom of the fulcrum member 18 to mesh and lock into the teeth of the plate frame 12. A variable amount of lost motion will occur due to the random point of engagement. But when the vertical or near vertical faces of the corresponding teeth meet, the fulcrum member 18 is prevented from moving any further to the right. At this time, the fulcrum member 18 is effectively locked to the plate frame 12 and becomes a true fulcrum through which the mechanical advantage is achieved.

A slight further counterclockwise rotation of the lever 46 due to the continued force by the input link 42 causes the pin 48 to move into that portion of the cam slots 50 which is a true arc about the axis of pin 52 when the fulcrum member 18 is in its locked position with the plate frame 12. It should be noted that the detent spring 58 applies only the initial downward spring force on lever 46, to initiate the tooth engagement. Thereafter, the teeth are positively held in engagement by the action of pin 48 in cam slots 50. The position of the mechanism approximately midway during its force multiplication stroke is shown in FIG. 2.

The system now operates as a simple lever system having a fixed fulcrum axis about the centerline of pin 52, an input axis at the centerline of pin 48 and an output axis at the centerline of the unidirectional bearing which is axis 62. The force ratio is therefore the ratio of the distance from the centerline of pin 52 to the centerline of pin 48, to the distance from the centerline of pin 52 to axis 62. In FIGS. 1 and 2, this ratio is approximately 5, i.e., the output force exerted by output rod 64 is approximately five times greater than the force applied to input rod 40. The output rod 64 stroke, available in this mode, is relatively small but more than adequate for the anticipated applications.

To initiate the return stroke, the force on the input rod 40 is reversed by its driving air cylinder or other prime mover. The input rod 40 moves to the right rotating the lever 46 clockwise through pin 44, input link 42, and pin 48. The fulcrum member 18 is still locked to plate frame 12, causing the lever 46 to rotate about pin 52. The clockwise rotation of the lever 46 continues until the pin 48 nears the right end of cam slots 50, where a slight rise in the cam slots 50 lifts pin 48 and, through its lever 46, the fulcrum member 18 upward. During the final short portion of clockwise rotation of the lever 46, this action lifts the fulcrum member 18 completely clear of tooth engagement with plate frame 12 and the detent spring 58 reengages the lever 46 in the extreme clockwise position.

With the fulcrum member 18 completely disengaged from the plate frame 12, the input rod now retracts the entire mechanism assembly including the output rod 64. During the clockwise rotation of the lever 46, the spring 70 was retracting the output rod 64. However, to insure positive retraction under conditions where the output rod 64 may be held or restricted by the output load, the slots 68 which are engaged by pin 66 insure positive retraction. These slots 68 are only long enough to permit the required relative motion of the output rod 64 with respect to the subframe 16 during the force multiplication stroke.

This mechanism has been described and drawn within a housing having a rectangular cross-section. This same type of mechanism with small suitable design changes can be operated in a circular housing. In such a design the grooves or teeth may be cut into the housing using a thread cutting technique and subsequently broaching a smooth surface through the cylinder over that area where no teeth are desired. The resultant teeth would therefore be helical, but the helix angle would be so small as to have no effect on the operation of the mechanism.

A still different mechanism is described below. The major principles still apply but the technique of locking the subframe to the housing is different, depending upon a frictional wedge type locking as opposed to the tooth type locking described above.

Referring to the drawing FIGS. 5, 6, 7, 8 and 9, this mechanism is housed in a cylindrical housing 80 which is suitably connected at the right or input end to an air cylinder or other comparable prime mover as illustrated in FIG. 1. At the left or output end of the housing 80 will be connected a suitable output head which guides and seals the slidably mounted output rod.

A cylindrical subframe 82 is slidably mounted within the housing 80. This subframe 82 has cut into it two openings: one opening 84 is left open for purposes of assembly and operation; the other opening has welded or otherwise suitably fastened into it a fulcrum member 86. A lever 88 is seated in a cylindrical bearing seat 89 in the fulcrum member 88 and retained in place by pin 90 which extends through two mating holes in subframe 82. The centerline of the pin 90 and the cylindrical bearing seat 89 in the fulcrum member 86 are concentric and provide a higher load capacity in the primary load direction than the pin alone can provide.

The outboard end of the lever 88 is connected to input link 92 through pin 94. The other end of the input link 92 is connected to the input rod 96 by pin 98; while the other end of the input rod 96 is connected to the air cylinder or other prime mover. A detent spring 100 engages the lower end of the input link 92 to maintain the mechanism in its direct coupled mode as shown in FIG. 5.

An output link 102 is mated to the lever 88 through a cylindrical surface 103, forming a unidirectional bearing about axis 104. The other end of the output link 102 is connected to an output rod 106 through pin 108, which extends on both sides beyond link 102 to engage slots 110 in the cylindrical subframe 82. A spring 112 is connected between the output rod 106 and subframe 82 to keep the unidirectional bearing surface 103 mated between the output link 102 and lever 88.

The right end of the cylindrical subframe is formed into a generally pyramidal surface having six faces (FIG. 9), each of which is concave with a radius of curvature nominally identical with the inside radius of the cylindrical housing 80. Between each such concave face and the housing 80 is contained a barrel shaped roller 114 of the type generally associated with spherical self aligning roller bearings. The rollers are confined axially between an unlock washer 116 and a retainer and separator spring 118, which in turn is backed up by washer 120 held in place by snap ring 122 mounted in a groove at the end of the cylindrical subframe 82.

The unlock washer 116 is actuated axially by three short unlock pins 124 slidably mounted in three equally spaced holes in the cylindrical subframe 82. The other ends of these pins 124 are in contact with the end face of an unlock sleeve 126 which is slidably mounted within the cylindrical subframe 82. This unlock sleeve 126 is maintained in angular alignment with the cylindrical subframe 82 through a slot 128 which straddles the extension of the fulcrum member 82. The depth of this slot also limits the axial movement of the unlock sleeve 126.

During that portion of the extension stroke where the output load encountered is below the threshold value, the entire mechanism assembly mounted to the subframe 82 moves as a unit through the housing 80. The input and output movement are identically equal and there is no force multiplication. It will be noted that the unlock sleeve is held in its retracted position by a cam face 130 on the back side of the lever 88, which in turn is held in its full clockwise position by detent spring 100. The unlock sleeve 126, unlock pins 124, and unlock washer 116 combine to hold the rollers 114 slightly out of contact with the inclined concave surfaces of the pyramidal section of the subframe 82 or the housing 80 so no wedging action may occur. This also slightly compresses the spring 118.

At any point in the stroke that the output rod encounters a load in excess of an amount determined by the detent spring 100, the lever 88 starts to rotate in a counterclockwise direction due to the couple exerted through the input link 92 and the resistance provided by the output link 102. During the initial counterclockwise rotation of the lever 88, the unlock sleeve 126 is permitted to move to the left by the retracting cam face 130; this in turn permits the spring 118 to move the rollers into a lightly loaded contact with both the housing 80 inside diameter and the concave surfaces of the pyramidal section of the subframe 82.

During this same initial counterclockwise rotation of the lever 88, the rotation takes place nominally about axis 104 since at this point the output rod 106 has been nominally stopped by its external load. This causes the cylindrical subframe 82 to tend to reverse and move to the right. The rollers now act as wedge locks preventing such reverse movement after a slight initial elastic take-up. The cylindrical subframe becomes effectively locked to the housing 80 and the fulcrum member becomes a true fulcrum through which the mechanical advantage is achieved.

The system now operates as a simple lever system having a fixed fulcrum about the axis of the pin 90, an input axis at the centerline of pin 94 and an output axis 104. The position of the mechanism approximately midway during the force multiplication stroke is shown in FIG. 6. The force ratio is the ratio of the distance from the centerline of pin 90 to the centerline of pin 94, to the distance from the centerline of pin 90 to axis 104. In FIGS. 5 and 6, this ratio is approximately 5, i.e., the output force exerted by the output rod 106 is approximately 5 times greater than the load applied to the input rod 96.

To initiate the return stroke, the force on the input rod 96 is reversed by its driving air cylinder or other prime mover. The input rod 96 moves to the right rotating the lever 88 clockwise through pin 98, input link 92 and pin 94. The cylindrical subframe 82 and fulcrum member 86 remain locked to the housing 80 until near the end of the clockwise rotation of lever 88, the cam face 130 recontacts the face of the unlock sleeve 126 causing it to move towards the right. This in turn exerts an unlock force on the rollers 114 through unlock pins 124 and unlock washer 120. Furthermore, the reactive force from the end face of the unlock sleeve 126 to the cam face 130 of the lever 88 causes a force on the pin 90 tending to move the cylindrical subframe 82 towards the left thereby contributing to the unlocking operation.

This combination of forces unlocks the rollers which are then again held slightly out of contact with their mating wedging surfaces. Simultaneously the detent spring 100 re-engages the input rod 96 completing the return cycling of the force multiplication mechanism.

Continued retraction of the input rod 96 retracts the subframe 82, now unlocked from the housing 80, and the entire mechanism associated therewith. During the clockwise rotation of lever 88, the spring 112 was retracting the output rod 106. However, to secure positive retraction under condition where the output rod 106 may be held or restricted by the output load, the slots 110 which are engaged by pin 108 insure positive retraction. These slots are only long enough to permit the required relative motion of the output rod 106 with respect to the subframe 82 during the force multiplication stroke.

This mechanism has been described and drawn within a housing having a circular cross-section. This same type of mechanism with small suitable design changes can be accommodated to a rectangular or square housing. In such a design the lock rollers could be true cylinders and the pyramidal faces of the subframe could be true planes.

Another variation of this mechanism would substitute the use of sprags in place of lock rollers. Such a substitution is shown in FIG. 10. The pyramidal section of the subframe is replaced by a section parallel to the inside of the housing. The locking action of sprags is not dependent on the angular or wedging characteristics of the confining surfaces as is the case with rollers. Instead, the locking action of a sprag is due to its intrinsic shape and positioning. Its working edges consist of nominally cylindrical (in section) surfaces, whose centers are offset, thereby creating a wedge lock action in one direction when the sprag is confined at a slight angle between two parallel surfaces whose interface distance is fixed. The advantage of a sprag lock system over a roller lock system is greater load capacity and better load distribution.

Such a system is shown in FIG. 10. It will be understood that those portions of this overall system which are not shown will be nominally identical with that shown in FIGS. 5 and 6. The upper half of the section shown in FIG. 10 shows the sprag stack in the unlocked or direct coupled mode and in the condition that exists during retraction. The lower half of the section shown in FIG. 10 shows the sprag stack in the locked or force multiplication mode.

The extreme right end of the revised cylindrical subframe 140 consists of a hexagonal prism each of whose faces is concave and parallel to the inside surface of the housing 80, with the radius of curvature of each concave face nominally identical with the inside radius of the housing 80. Between each such face and the housing are confined a series of sprags 142 inclined at a slight angle. These sprags 142 are axially confined by a shoulder 144 on the cylindrical subframe 140 and by a retainer washer 146 fastened to the cylindrical subframe 140 by snap ring 148. An elastic washer 150 is interposed between the last sprag 142 and the washer 146 to compensate for the slight variation in stack height which occurs when the tilt angle of the sprag stack is changed. A toroidal U section spring 152 provides the initial contact pressure as the mechanism is in transition from the direct coupled mode to the force multiplication mode. An unlock washer 154 is piloted on the outside diameter of shoulder 144 and is guided thereon during its slight axial movement. It is actuated by the unlock pins 124 as was the case with the roller lock system. The outer ridge of the unlock washer 154 bears against the outer sides of the sprag stacks during the unlcok sequence and the force applied by this washer and the reaction of the elastic washer 150 exert a couple on the sprag stack increasing their inclination thereby breaking their wedge lock action. All other portions of the extension and retract sequence are the same as that of the roller lock mechanism.

The number of sprags can be adjusted to accommodate the load requirements of each particular design. Furthermore, the sprag lock design may also be adapted to a square, rectangular, or other polygonal section housing with suitable minor changes.

I claim:

1. A force transferring and multiplying system which comprises:
   a. a support,
   b. a lineal input shaft adjacent said support,
   c. a lineal output shaft adjacent said support,
   d. lever means connecting said shafts comprising a second order lever wherein said shafts are connected to said lever on the same side of a fulcrum.
   e. means movably related to said support to form a fulcrum for said lever, and
   f. means responsive to a predetermined force between said shafts to lock said fulcrum means relative to said support to permit said lever to function to create force multiplicaton between said input shaft and said output shaft.

2. A force transferring and multiplying system as defined in claim 1 in which:
   a. said support comprises an elongate frame and said fulcrum means comprises a slide member movable in said frame, and
   b. said means to lock said fulcrum means to said support comprises teeth formed on said support and teeth formed on said fulcrum means positioned to engage upon transverse motion of said fulcrum means relative to said support.

3. A force transferring and multiplying system as defined in claim 1 in which:
   a. said input and output shafts are mounted selectively to move relative to each other and simultaneously in the same lineal direction,
   b. resilient means acting between said shafts to resist relative motion therebetween, and
   c. said means to lock said fulcrum means comprises interengageable means on said support and on said fulcrum means engageable in response to relative motion between said shafts against said resilient bias.

4. In a linear motion system a device for increasing the mechanical advantage from the input to the output which becomes active at any point along the travel path, with said activation being automatically initiated when the output encounters a substantial resistance to motion due to the output load comprising:
   a. a linear moving input member,
   b. a linear moving output member,
   c. a basic frame to guide said input member and said output member, and
   d. means interposed between said input member and said output member and also guided in said frame comprising:
      1. a subframe which directly couples said input member and said output member causing said output member to move in unison with said input member as long as the output is below a predetermined threshold value,
      2. a movable locking member connected to said subframe which locks said subframe to said basic frame at any point along the travel of said subframe, said point being determined when the output load exceeds the aforesaid threshold value,
      3. means connected to said subframe which is actuated by said input member and in turn actuates said output member with a significant increase in mechanical advantage during the interval that said subframe is locked to said basic frame by said locking member,
      4. means in said subframe which disengages said locking member from said basic frame during the initial retraction of said input member, and
      5. means in said subframe to retract said output member with said subframe when said input member retracts.

5. A force transferring and multiplying system which comprises:
   a. a tubular support member,
   b. a fulcrum means movably positioned in said support member,
   c. an input shaft extending into one end of said support member movably associated with said fulcrum means,
   d. an output shaft extending into the other end of said support member movably associated with said fulcrum means,
   e. locking means on said fulcrum means movable to engage with said support member to block translative movement between said fulcrum means and said support member,
   f. a lever means on said fulcrum means pivotally associated with said input shafts at spaced points,
   g. means forming a fulcrum on said fulcrum means pivotally associated with said lever means at another point, and
   h. means responsive to relative motion between said input and output shafts to actuate said lock means to immobilize said fulcrum relative to said support member to permit said lever to function to multiply force applied to said input shaft.

6. A device as defined in claim 5 in which resilient means is interposed between said shafts to resist relative motion therebetween except upon application of a predetermined force.

7. A device as defined in claim 5 in which said fulcrum means is dimensioned to permit transverse motion relative to said support, and said lock means on said fulcrum means and said support have complemental teeth to interengage in response to such transverse motion, and means resiliently to bias said fulcrum means against said transverse motion.

8. A device as defined in claim 7 in which said fulcrum means has a guide slot therein, and means on said lever engageable in said slot to assist in the positioning of said fulcrum means transversely of said support.

9. A device as defined in claim 7 in which said output shaft has a bearing surface to engage a conplemental surface on said lever, and resilient means to hold said surfaces in bearing contact.

10. A device as defined in claim 5 in which a one-way lineal clutch means is interposed between said fulcrum means and said support means to provide said lock means, said clutch means having means actuated by relative motion of said input and output shafts to effect engagement and disengagement.

11. A device as defined in claim 5 in which a one-way lineal clutch is interposed between said fulcrum means and said support means to provide said lock means comprising opposed relatively movable surfaces disposed at an angle to each other, respectively on said support member and said fulcrum means, circular means between said surfaces dimensioned to provide a wedge lock, and resilient means biasing said circular means to a locking position between said surfaces upon a predetermined relative movement between said input and output shafts.

12. A device as defined in claim 5 in which a one-way lineal clutch is interposed between said fulcrum means and said support means to provide said lock means comprising opposed relatively movable surfaces respectively on said support member and said fulcrum means, and sprag clutch elements disposed between said surfaces, and resilient means biasing said clutch elements to a locking position between said surfaces operable upon relative motion between said input and output shafts.

* * * * *